United States Patent [19]

Tsonis et al.

[11] Patent Number: 5,541,847

[45] Date of Patent: Jul. 30, 1996

[54] METHOD FOR AUTOMATICALLY GENERATING A CHENILLE FILLED EMBROIDERY STITCH PATTERN

[75] Inventors: Anastasios Tsonis, Village of Conestogo; Brian J. Goldberg, Thornhill; Aaron M. Divinsky, Mississauga; Alexander Nicolaou, Mississauga; Benito Chia, Jr., Mississauga; Niranjan Mayya, Mississauga, all of Canada

[73] Assignee: Pulse Microsystems Ltd., Canada

[21] Appl. No.: 526,157

[22] Filed: Sep. 11, 1995

Related U.S. Application Data

[63] Continuation-in-part of Ser. No. 323,157, Oct. 14, 1994, Pat. No. 5,506,784.

[51] Int. Cl.⁶ .................................................. G06F 19/00
[52] U.S. Cl. ........................... 364/470.09; 112/475.19
[58] Field of Search ................................... 364/188–193, 364/470; 112/103, 102, 457, 546, 121.12, 121.11, 454, 121.13

[56] References Cited

U.S. PATENT DOCUMENTS

| 5,056,444 | 10/1991 | Lowry et al. ........................... 112/221 |
| 5,151,863 | 9/1992 | Komuro et al. ........................ 364/470 |
| 5,189,622 | 2/1993 | Hayakawa et al. ..................... 364/470 |
| 5,270,939 | 12/1993 | Goldberg et al. ...................... 364/470 |
| 5,283,747 | 2/1994 | Komuro et al. . | |
| 5,343,401 | 8/1994 | Goldberg et al. ...................... 364/470 |

OTHER PUBLICATIONS

"Voroni Diagrams of Polygons: A Framework For Shape Representation," N. Mayya and V. T. Rajan, Proceedings of IEEE CVPR 1994, Seattle, Washington.

"Voroni Skeletons: Theory and Applications", R. Ogniewicz and M. Ilg, Proc Conference on Vision and Pattern Recognition, Champaign, Illinois, 1992, pp. 63–69.

"A Transformation For Extracting New Descriptors Of Shape", Models for the Perception of Speech and Visual Form (W. Wathen–Dunn, ed.), H. Blum, 1967, Cambridge MA: MIT Press.

*Primary Examiner*—James P. Trammell
*Attorney, Agent, or Firm*—Lawrence G. Kurland; David M. Klein; Bryan Cave LLP

[57] ABSTRACT

An improved method for automatically generating chenille filled embroidery stitch patterns and/or chain stitching in a computer aided design system in which the shape to be filled is a complex polygon. A spine of a medial axis of the Voronoi Diagram of the polygon is determined, modified concentric polygons are then constructed by clipping the edges of the concentric polygons that are within a clip width of the spine, the modified concentric polygons are then sorted and spirals are placed along the modified polygons with stitches being placed along the spirals, with the occurrence of any bald spots in the shape being filled being minimized. For chain stitching, rather than placing spirals, the chain stitches are placed on the perimeter of the concentric polygons.

16 Claims, 23 Drawing Sheets

A. Spiral type chenille

1. Determine the "medial axis"

↓

Create rays emanating in towards the shape from every corner of the shape that is less than 90 degrees by constructing a vector that bisects the angle of the corner.

↓

For corners that have an interior angle greater than 90 degrees, two rays must be constructed each pointing in a direction perpendicular to one of the edges of the corner.

↓

Put all these rays in a *circular list*.

↓

While there are rays in the list:

↓

Call the first element in the list the head.

↓

If the head points directly into another ray, remove the head and the other ray from the list, add them to a list of final rays.

A. Spiral type chenille

> 1. Determine the "medial axis"

> Create rays emanating in towards the shape from every corner of the shape that is less than 90 degrees by constructing a vector that bisects the angle of the corner.

> For corners that have an interior angle greater than 90 degrees, two rays must be constructed each pointing in a direction perpendicular to one of the edges of the corner.

> Put all these rays in a *circular list*.

> While there are rays in the list:

> Call the first element in the list the head.

> If the head points directly into another ray, remove the head and the other ray from the list, add them to a list of final rays.

FROM FIGURE 7A

Find an edge that forces the head to stop and call it the closest candidate.

Use the closest candidate and the head to compute all new rays that emanate from the head's endpoint.

Add the new rays to the list; remove the head and add it to the list of final rays.

2. Construct concentric polygons

For all the segments in the whole shape:

For each edge in the original polygon, construct a new polygon made up of those edges of the medial axis that are closest to the edge being considered.

B. Chain stitching

1. Determine the "medial axis"

Create rays emanating in towards the shape from every corner of the shape that is less than 90 degrees by constructing a vector that bisects the angle of the corner.

⬇

For corners that have an interior angle greater than 90 degrees, two rays must be constructed each pointing in a direction perpendicular to one of the edges of the corner.

⬇

Put all these rays in a *circular list*.

⬇

While there are rays in the list:

⬇

Call the first element in the list the head.

⬇

If the head points directly into another ray, remove the head and the other ray from the list, add them to a list of final rays.

FROM FIGURE 8A

Find an edge that forces the head to stop and call it the closest candidate.

Use the closest candidate and the head to compute all new rays that emanate from the head's endpoint.

Add the new rays to the list; remove the head and add it to the list of final rays.

2. Construct concentric polygons

For all the segments in the whole shape:

For each edge in the original polygon, construct a new polygon made up of those edges of the medial axis that are closest to the edge being considered.

FROM FIGURE 8B

Sweep a line through the polygon and compute all the segments of all positions of the line that fall in the interior of the polygon.

Determine for each edge which edges are adjacent to it to construct the concentric polygons.

Output the list of polygons.

3. Sort the polygons

4. Place Chain stitches on the perimeter of the concentric polygons at a specified length

FIGURE 8C

METHOD FOR AUTOMATICALLY GENERATING A CHENILLE FILLED EMBROIDERY STITCH PATTERN

CROSS-REFERENCE TO RELATED APPLICATIONS

This is a continuation-in-part application of commonly owned U.S. patent application Ser. No. 08/323,157, filed Oct. 14, 1994, now U.S. Pat. No. 5,506,784 and is related to our commonly owned, copending United States patent applications Ser. No. 08/323,156, filed Oct. 14, 1994, and Ser. No. 323,156, filed Oct. 14, 1994, and to our commonly owned, contemporaneously filed copending United States patent application entitled "Method for Automatically Generating Chain Stitches", Ser. No. 08/526,412 the contents of each of which are incorporated herein by reference in their entirety.

BACKGROUND OF THE INVENTION

1. Field of the Invention

The present invention relates to methods for automatically generating filled embroidery patterns in a computer aided design system, and more particularly to an improved method for automatically generating a chenille filled embroidery stitch pattern in a computer aided design system.

2. Description of the Related Art

Computer aided design systems for controlling embroidery machines are well known in the art. Such systems allow the user to select embroidery patterns to be stitched either through a stored series of designs or creation of original designs, such as described in our previously issued U.S. Pat. No. 5,430,58, entitled "Method for Creating Self-Generating Embroidery Pattern", and our previously issued U.S. Pat. No. 5,343,401, entitled "Embroidery Design System". In such prior art systems, embroidery patterns may typically be generated in an outline form of a particular shape such as a letter or an animal, or may be filled in with stitches. It is also known in the art to be able to modify the embroidery design programs used in such computer aided design systems so that the user may independently vary and modify a large variety of characteristics of an existing embroidery design program including, such as described in our previously issued U.S. Pat. No. 5,270,939.

In addition, chenille type embroidery machines capable of providing chenille type stitching, which produces a towel like effect in the embroidery pattern, are also well known, such as disclosed, by way of example, in U.S. Pat. No. 5,056,444. A typical conventional chenille type embroidery machine is manufactured by Tajima Industries Ltd. of Japan. As noted in U.S. Pat. No. 5,056,444, which describes a prior art chenille type embroidery machine, chenille type embroidery machines provide a fuzzy appearance of a pattern, for example, such as on an athletic award or letter, with the fuzzy appearance being formed by the use of a hooked needle which, in combination with a looper, which wraps thread around the needle (as illustrated in FIGS. 1A–1E), pulls a thread through a piece of material. Such a stitch is known as a "moss" stitch and is performed by the looper looping thread over the hook of the needle below the material to be embroidered. The needle then pulls the looped thread through and above the material. Another device known as the X/Y drive then pulls the material away from the raised needle causing the looped thread to slip off the hook. The needle again penetrates the material and the process is repeated, resulting in a fuzzy patterned item.

By reversing the hook of the needle so that the looped thread remains on the hook after the X/Y movement of the material, a chain stitch can be formed. In such an instance, the X/Y drive pulls the material and the thread as in the above described prior art moss stitch procedure, but now the thread remains on the hook as the needle re-penetrates the material and a linked chain stitch is formed, such as illustrated in FIGS. 2A–2E. Chain stitching is generally used to follow the perimeter of a shape. Chenille stitching may be used to create a cross hatch or lattice chenille, such as illustrated in FIG. 3, or a spiral type chenille. In a lattice chenille, the pattern that is created by the loop stitch in order to fill a shape, has the stitching starting at one point in the shape and moving in straight lines diagonally covering the area, whereas in a spiral type chenille, in order to fill the shape the stitching is performed in a spiral fashion causing the embroidery machine to place stitches at many varying angles to provide a random/hand-done appearance.

Chenille stitching in the past was generally performed by hand which is a very tedious, time consuming task, and did not utilize the advantages of a computer aided design system which could allow the operator to make decisions on how the coverage would take place. Prior to applicants' invention, spiral coverage for chenille stitches was not automatically generated, but, rather, was accomplished either by hand or manually entered in the computer. Moreover, where the pattern was a complex polygon, there were difficulties in the prior art in trying to place chain stitching around a complex polygon. Thus, applicants are not aware of any efficient prior art computer aided design systems for generating filled embroidery patterns which enable chenille filled embroidery patterns, or chain stitches, to be automatically generated and this is so despite the wide spread use of computer aided design systems for controlling embroidery machines.

SUMMARY OF THE INVENTION

In a method for automatically generating filled embroidery stitch patterns in a computer aided design system capable of generating embroidery stitch patterns, the improvement comprises automatically generating a chenille filled embroidery pattern by selecting an associated polygon type shape, determining a spine of a medial axis of a Voronoi Diagram for that shape, constructing a plurality of modified concentric polygon shapes extending from the spine of the Voronoi Diagram to the outer edge of the selected polygon shape, sorting the constructed modified concentric polygon shapes for proper sequencing and minimal jumping of the selected pattern from one part to another, placing a plurality of spirals of varying size along the constructed modified concentric polygons for maintaining a consistent filling of the area contained within the selected shape, and stitching along the plurality of placed spirals for creating thread loops for providing the chenille type stitching to fill the selected polygon shape. The spacing between the adjacent modified concentric polygons and the spiral size and distance between the focal points from one spiral to another comprise the determinants of the fill density associated with the selected polygon shape. The edges of the concentric polygons that are within a distance referred to as the clip-width to the spine, which consists of those medial axis edges that define global axes of symmetry, such as described in the subsequently mentioned article by Mayya and Rajan, are clipped, pruned, and/or deleted to provide the modified concentric polygons. The purpose of this modification is to preferably prevent having too dense an area of stitching near the center of the shape. This minimizes the occurrence of bald spots in the shape being filled by the chenille type stitching. Chain stitching is provided around the selected polygon shape for covering the chenille filled embroidery pattern with chain stitches, with the chain stitches being placed on the perimeter of the constructed concentric polygon shapes at a predetermined length. The improved method of automatically generating chain stitches is preferably the same as for automatically generating chenille stitching with the exception that rather than placing the spirals along the concentric polygons after the concentric polygons have been constructed in the computer aided design system, the chain stitches are then placed on the perimeter of the concentric polygons. It should be noted that as used herein, the term "polygon" is not meant to be limited to a shape having only straight line segments, but is meant to include edges that are not straight lines, such as parabolic curves, as well.

BRIEF DESCRIPTION OF THE DRAWINGS

FIGS. 8(A–C) is a system flow diagram, similar to FIG. 7, of the presently preferred method of automatically generating chain stitching in accordance with the present invention.

DETAILED DESCRIPTION OF THE INVENTION

Figure 6A:
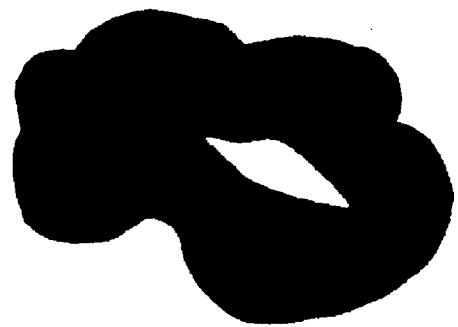
FIGS. 6A–6C are diagrammatic illustrations of a typical polygonal approximation procedure in accordance with the preferred method of the present invention.
Figure 6B:
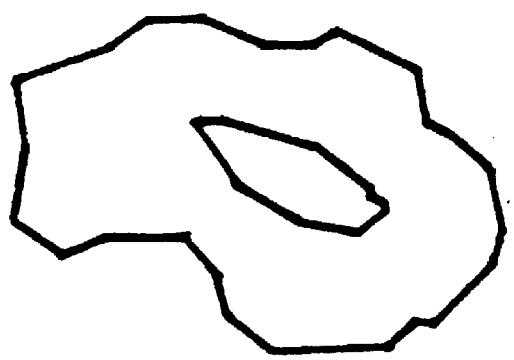
Figure 6C:
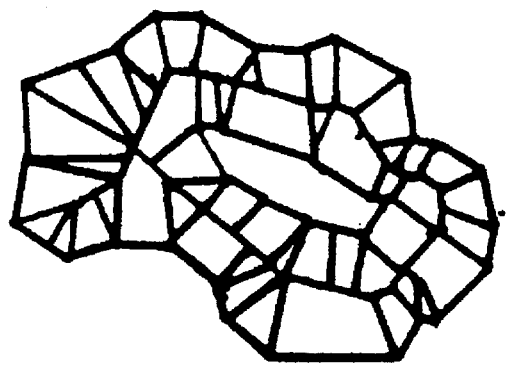

Referring to the drawings in detail, and initially to FIGS. 6A–6C, a typical framework for determining the Voronoi Diagram of a polygon shape is illustrated, with the medial axis of the polygon shape being readily obtainable by computing the Voronoi Diagram of the boundary line segments. Such Voronoi medial axes normally consist of segments of straight lines and parabola. This framework is described in "Voronoi diagrams of Polygons: A Framework for Shape Representation", N. Mayya and V. T. Rajan, Proceedings of IEEE VVPR 1994, Seattle, Wash., the content of which is incorporated herein by reference. In addition, the algorithm for analyzing the shape to be filled to determine its medial axis, sometimes referred to as its skeleton, is described in "A transformation for extracting new descriptors of shape", Models for the Perception of Speech and Visual Form (W. Wathen-Dunn, ed.), H. Blum, 1967, Cambridge Mass.: MIT Press, the content of which is incorporated herein by reference. As noted above, the medial axis of a polygonal shape can be obtained by computing the Voronoi Diagram of the boundary line segments of the polygonal shape, since the medial axis is exactly contained in the set of Voronoi edges of the polygon and is obtained by deleting the two Voronoi edges incident with each concave vertex. Since the Voronoi Diagram is merely a superset of the medial axis, with the medial axis being computed therefrom, for purposes of the present invention, the two terms shall be used interchangeably herein except where the relationship between the two must be separately described for clarity of understanding.

In accordance with the preferred method of the invention, a conventional computer aided design system is employed for generating embroidery stitch patterns, such as described in our U.S. Pat. No. 5,343,401, the contents of which are incorporated herein by reference in their entirety, with the computer employed typically being an IBM PC compatible computer running Microsoft Windows, and programmed in the "C" programming language. The method of the present invention adds the capability of automatically generating chenille as well as chain stitching to the embroidery designs which the computer aided design system can generate.

Figure 7C:
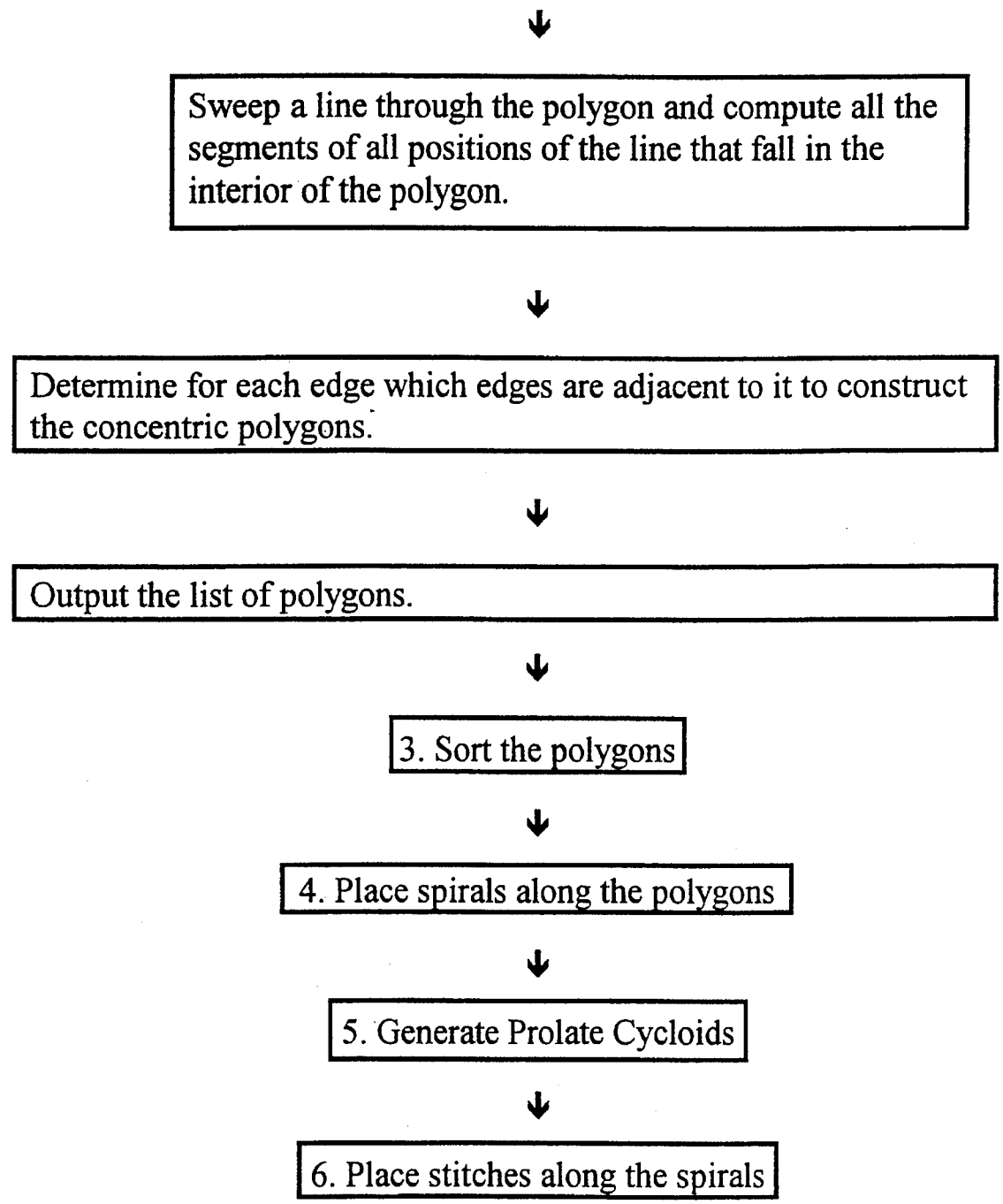
FIGS. 7(A–C) is a system flow diagram of the presently preferred method of automatically generating a spiral type chenille in accordance with the present invention.

As shown and preferred in FIG. 7, in accordance with the presently preferred method of the present invention for automatically generating spiral type chenille to provide a chenille filled embroidery pattern, first the shape to be filled is analyzed to determine its Voronoi diagram, with the shape to be filled preferably comprising a complex polygon with or without holes.

Computing the Voronoi Diagram involves computing all of the edges that lie inside the polygonal shape and that are equidistant from two of the original polygonal shape's sites, where the sites are either edges or vertices of the shape. The edges are either line segments, when the two sites they are equidistant from are both points, i.e., vertices of the polygonal shape, or both lines, i.e., edges of the polygonal shape; or parabolic edges, when the two sites are equidistant from one point and one line.

In accomplishing this analysis, the computer preferably creates rays emanating in towards the selected polygon shape from every corner of the shape that is less than 90 degrees by constructing a vector that bisects the angle of the corner. For corners of the selected complex polygon shape that have an interior angle that is greater than 90 degrees, preferably two rays are constructed by the computer, each pointing in a direction normal or perpendicular to one of the edges of the corner.

Each ray is then "traced" to find its terminating point, thus completely defining the Voronoi edge. As discussed above, each ray is equidistant from two sites, which are called its parents. The terminating point for that ray is determined by finding the point at which it is equidistant from three sites. The tracing step involves computing, for each site, the point on the ray at which it is equidistant from the parents and from that site. The site, with the closest such point from the start point is selected as the final end point of the ray.

For each site, the computer determines the set of Voronoi edges of which the site is a parent. This set of edges, along with the site itself, from a region called the Voronoi region of the site and must be a closed region.

In operation, the computer preferably puts all of the rays in a circular list which is a list in which the last element points back to the first element. While these rays are in the circular list, preferably the computer calls the first element in the list the head and if the head points directly into another ray, the computer then removes the head and the other ray from the list, adds them to a list of final rays, and returns to calling the first element remaining in the list the head and repeats the procedure. The computer then finds an edge in the polygon that forces the head to stop and calls it the closest candidate and then uses the closest candidate and the head to compute all new rays that emanate from the head's endpoint. The new rays are then preferably added to the list, the head is removed and added to the list of final rays, and the entire procedure is repeated for rays remaining in the list, with the process being stopped when the list is empty and all rays have been added to the final list.

Having determined the Voronoi Diagram, preferably the computer creates concentric polygons located between the outer edge of the polygonal shape and the Voronoi Diagram. The distance between the concentric polygons is one of the determinants of the fill. To construct the concentric polygons, for each point site at a non-convex edge, the computer determines a set of parallel parabolic arcs that lie inside the Voronoi region of the point site that are at successive offset of d from each other.

For each line site of the polygonal shape, the computer determines the endpoints of a parallel line segment that is contained inside the Voronoi region and that is at a specified offset distance from the line site. The computer collects a set of such parallel lines, each lying at successive offsets of d from the previous one. The set of offset edges at a given offset from the outer polygonal shape are collected together. This set represents the concentric or offset polygon/region for a given offset. This step is repeated for the edges at every offset level.

It will be appreciated that the concentric or offset polygons/regions include edges that are parabolic curves and are thus not strictly polygons (which generally include only straight edges). Rather, these polygons may more precisely be called closed regions that are at an exact offset distance d from the outermost polygonal shape. Nonetheless, as used herein, these closed regions shall be refereed to as offset or concentric polygons.

In operation, for each edge in the original selected polygon, the computer constructs a new polygon made up of those edges of the Voronoi Diagram that are closest to the edge being considered, sweeps a line through the polygon which has been generated, and computes all the segments of all positions of the line that fall in the interior of the polygon. Once this has been done for all the segments in the polygonal shape, the computer determines for each edge which edges are adjacent to it to construct the concentric polygons. The computer then outputs the list of offset polygons. Thereafter, the computer sorts these concentric polygons in order to allow for proper sequencing and minimal jumping from one part of the shape to another, preferably in order of increasing offset distance d.

In carrying out this sorting, preferably the polygons are sorted to determine which are inside which and, once all the polygons are sorted, they form a tree rooted at the outline of the selected shape. The outline preferably has one or more children which each, in turn, have one or more children inside them. Once the tree is constructed, preferably a standard depth first search is used to stitch the polygons in the correct order from the center emanating outwards to ensure that the stitches are in an order that will sew well and produce the desired design. Preferably, between each subtree of polygons, the location of the next subtree is run by following the edges of the previously constructed Voronoi Diagram which ensures that connecting runs are in the interior of the selected shape.

Figure 1A:
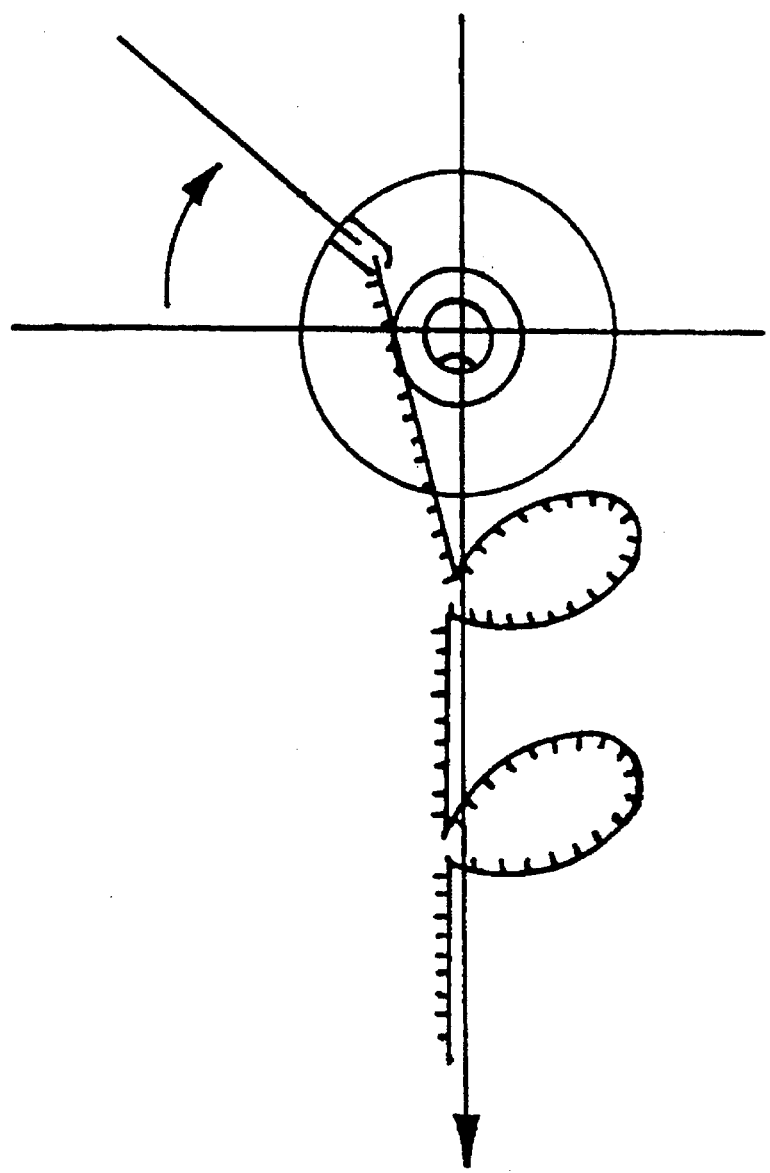
FIGS. 1A–1E are diagrammatic illustrations of a typical prior art method of providing a chenille stitch with a loop or moss stitch.
Figure 1B:
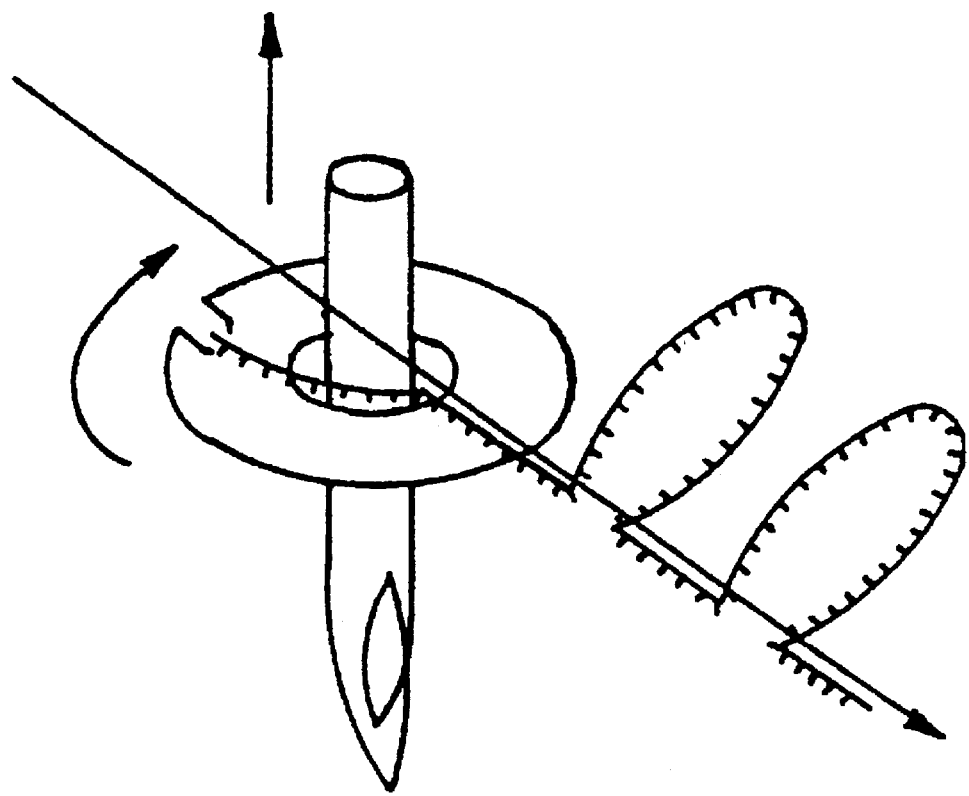
Figure 1C:
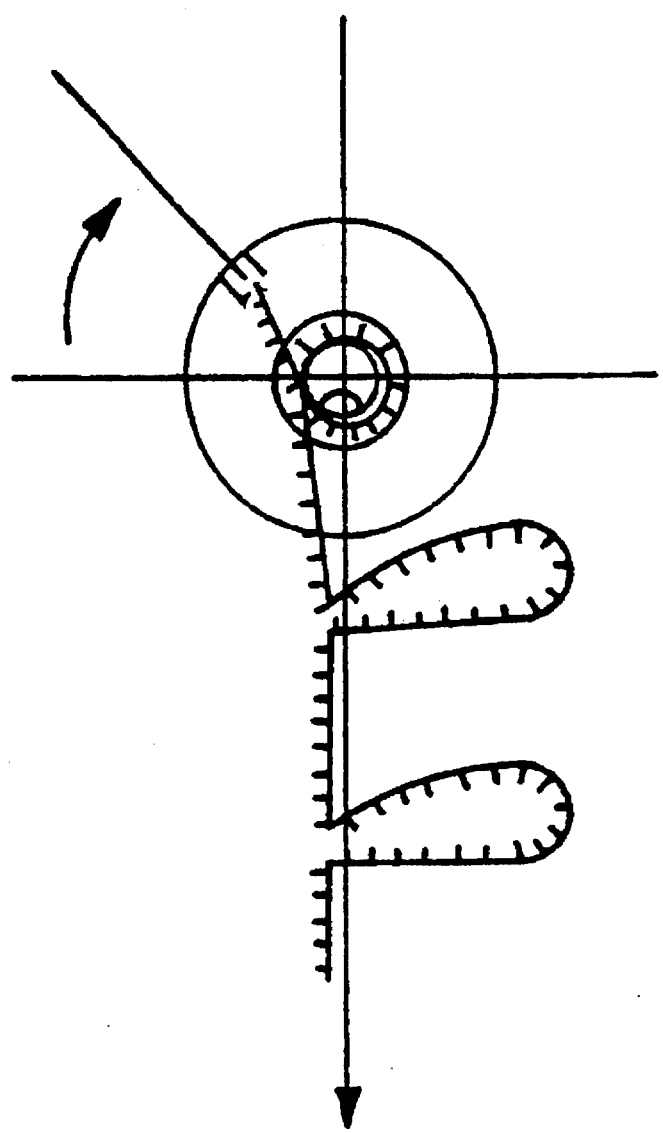
Figure 1D:
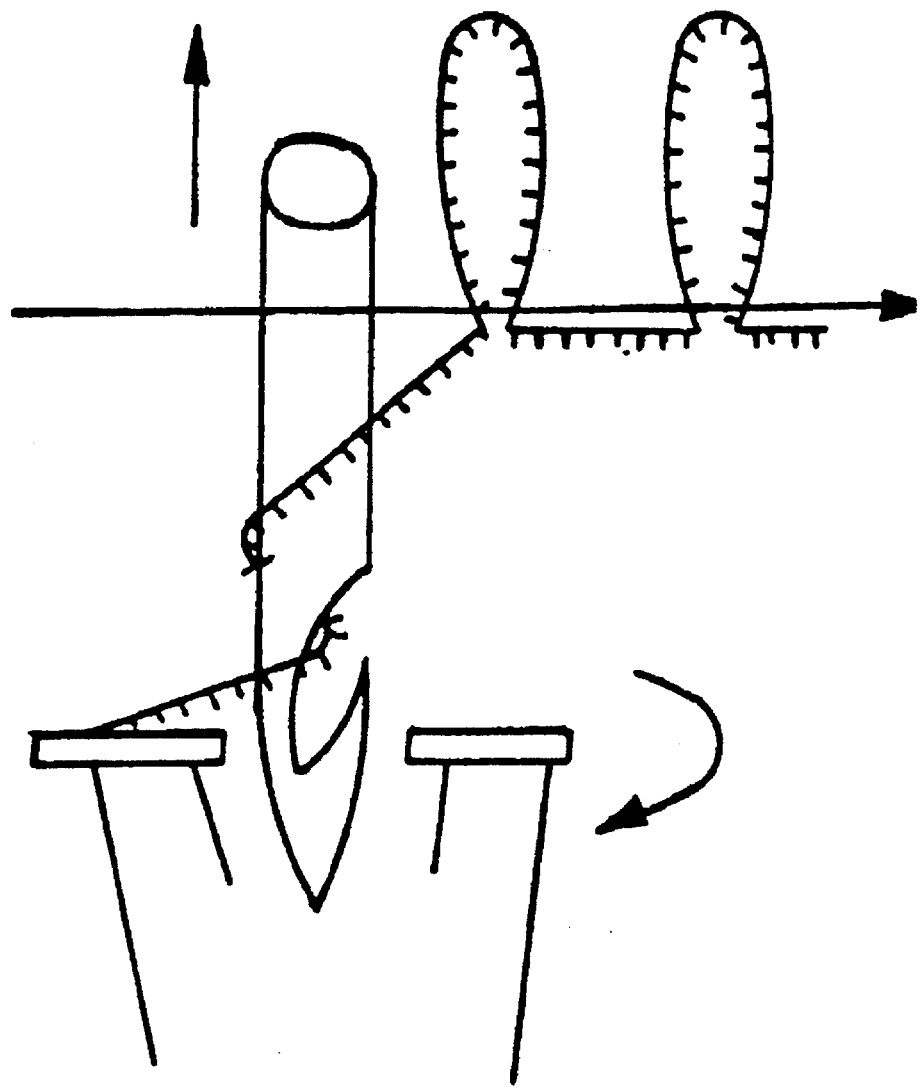
Figure 1E:
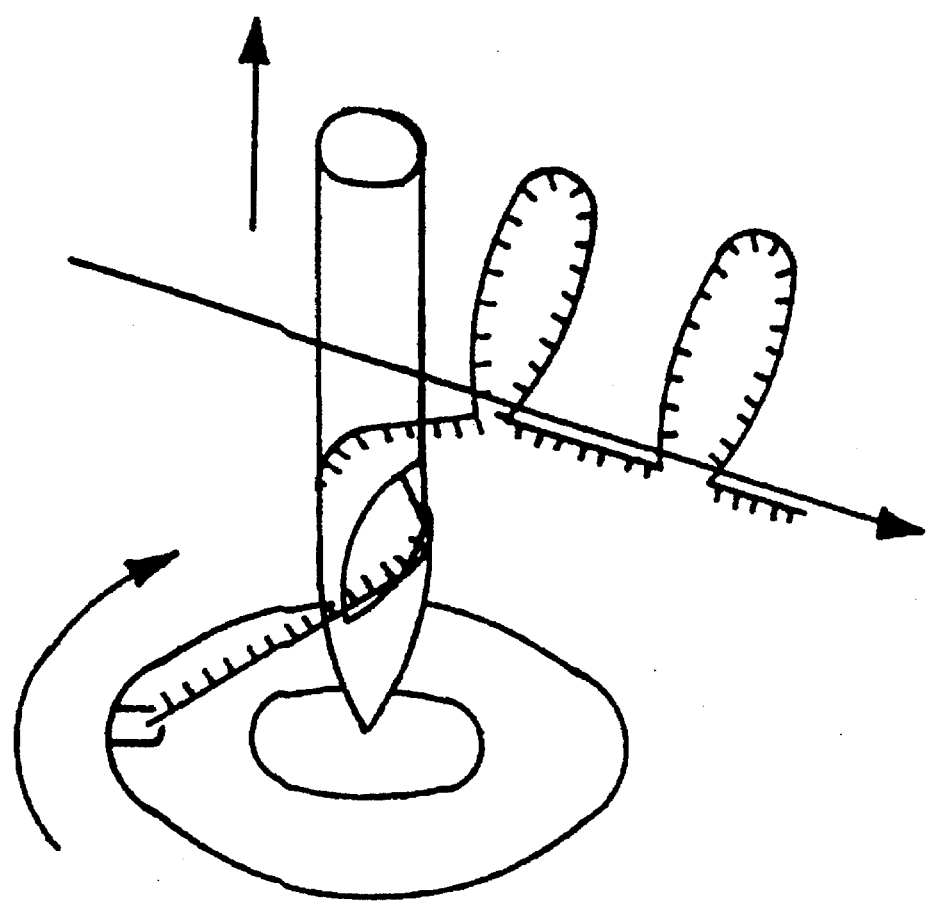
Figure 2A:
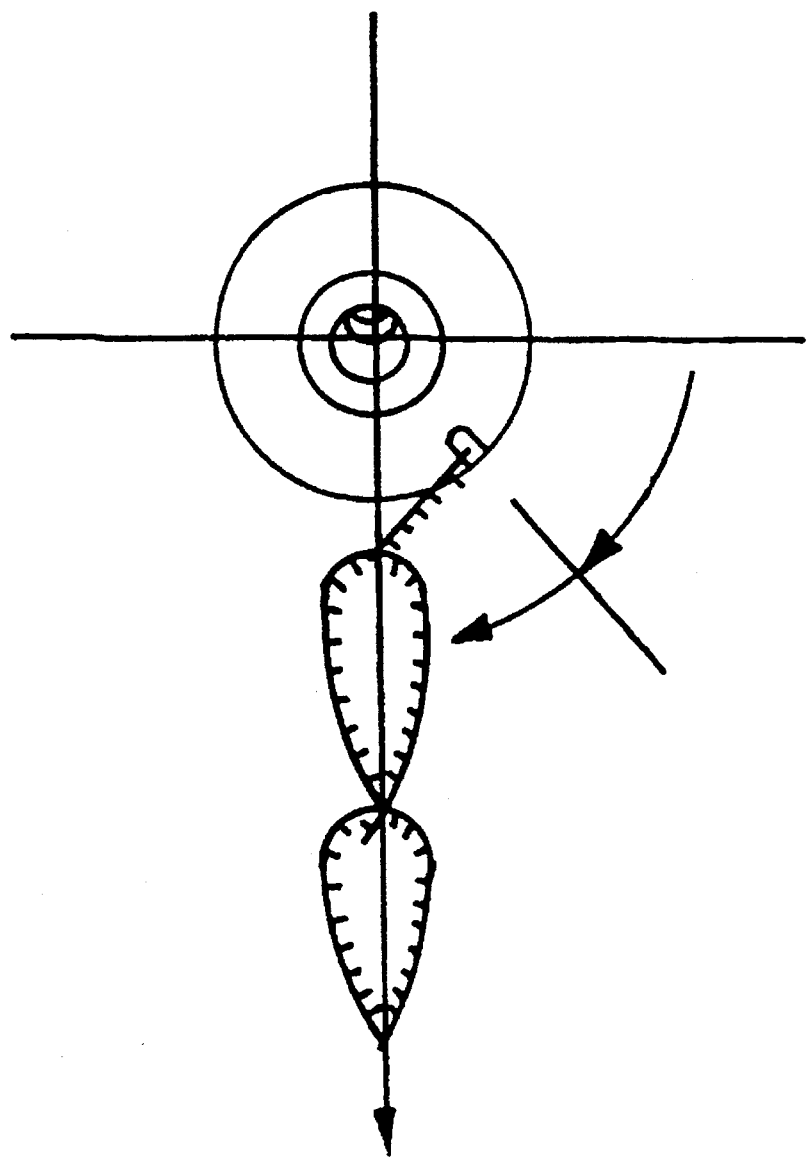
FIGS. 2A–2E are diagrammatic illustrations of a typical prior art method of providing a chain stitch.
Figure 2B:
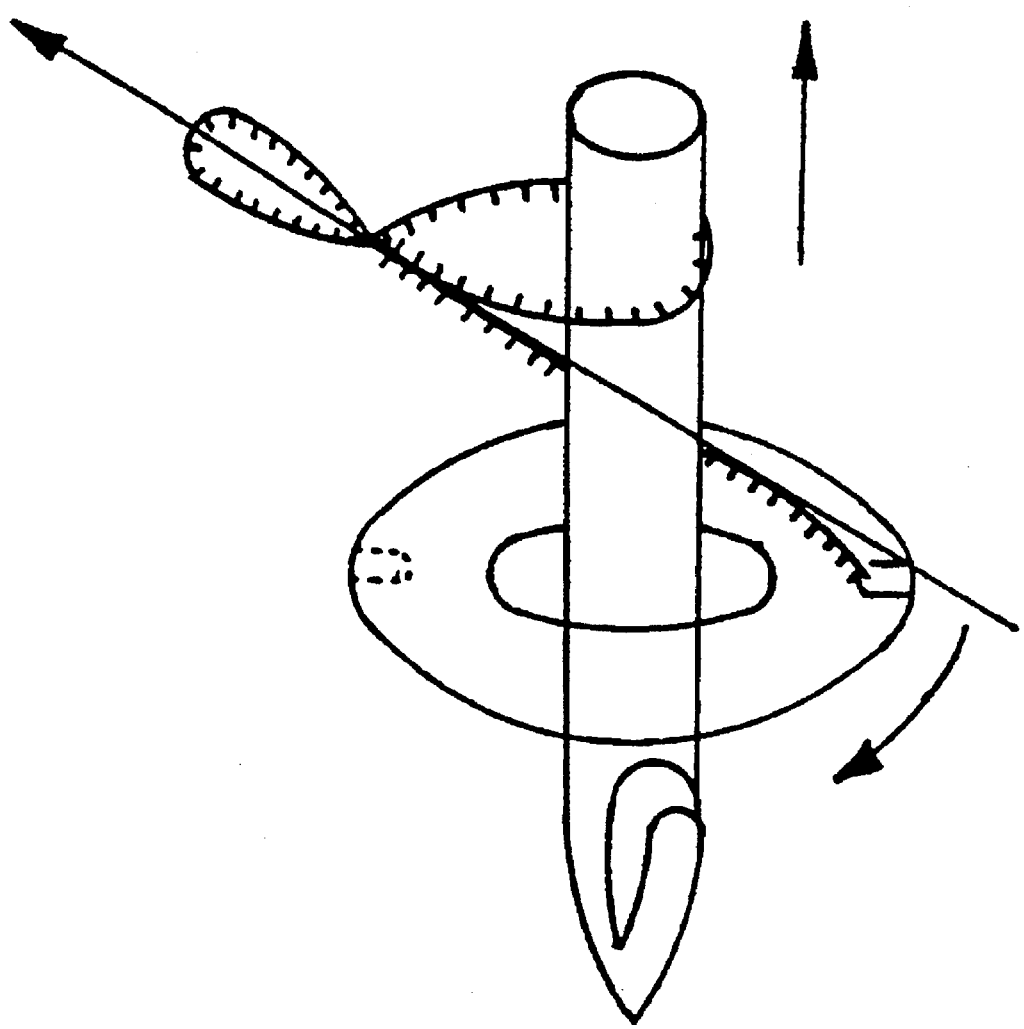
Figure 2C:
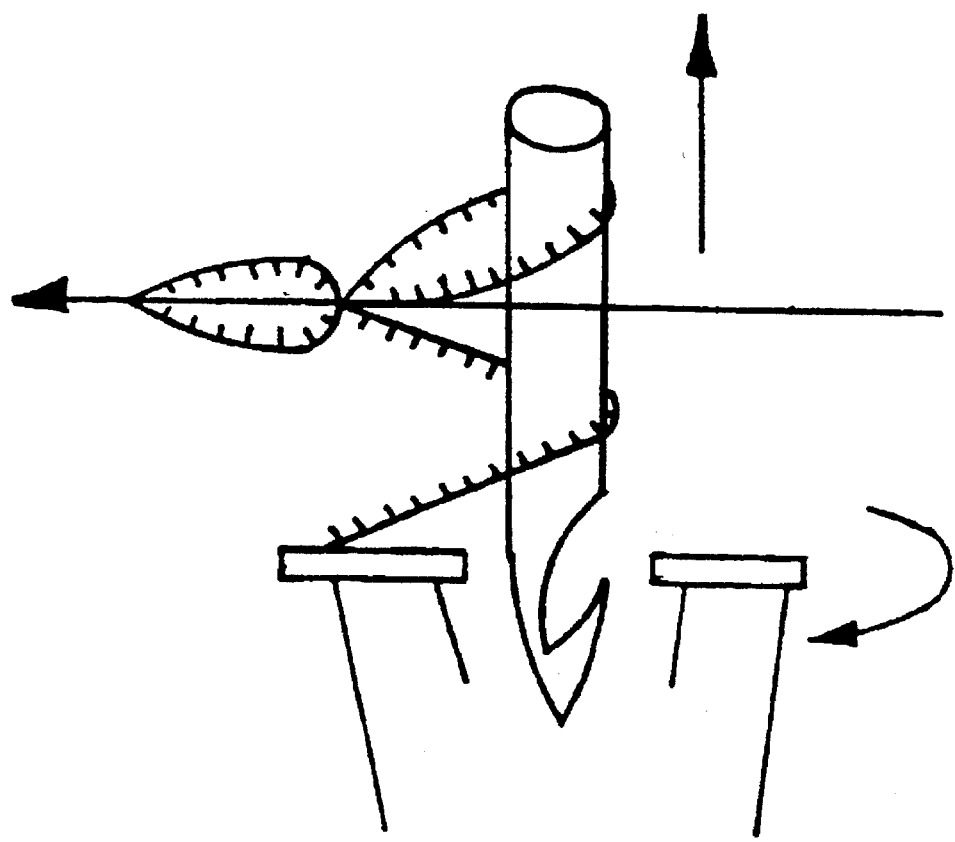
Figure 2D:
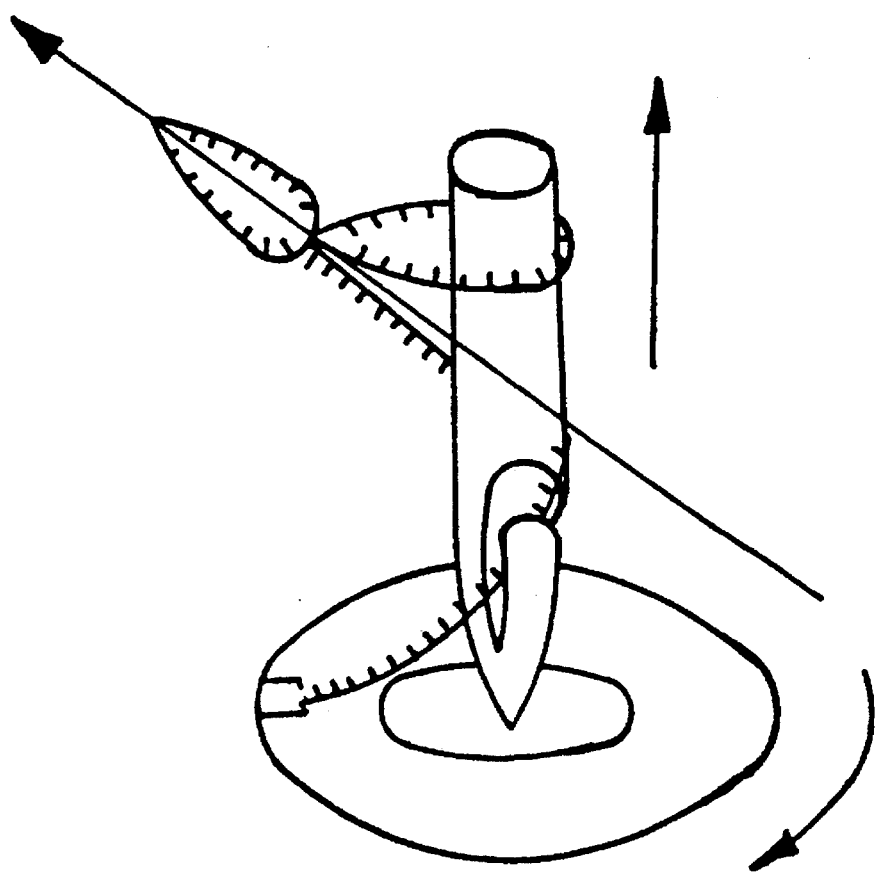
Figure 2E:
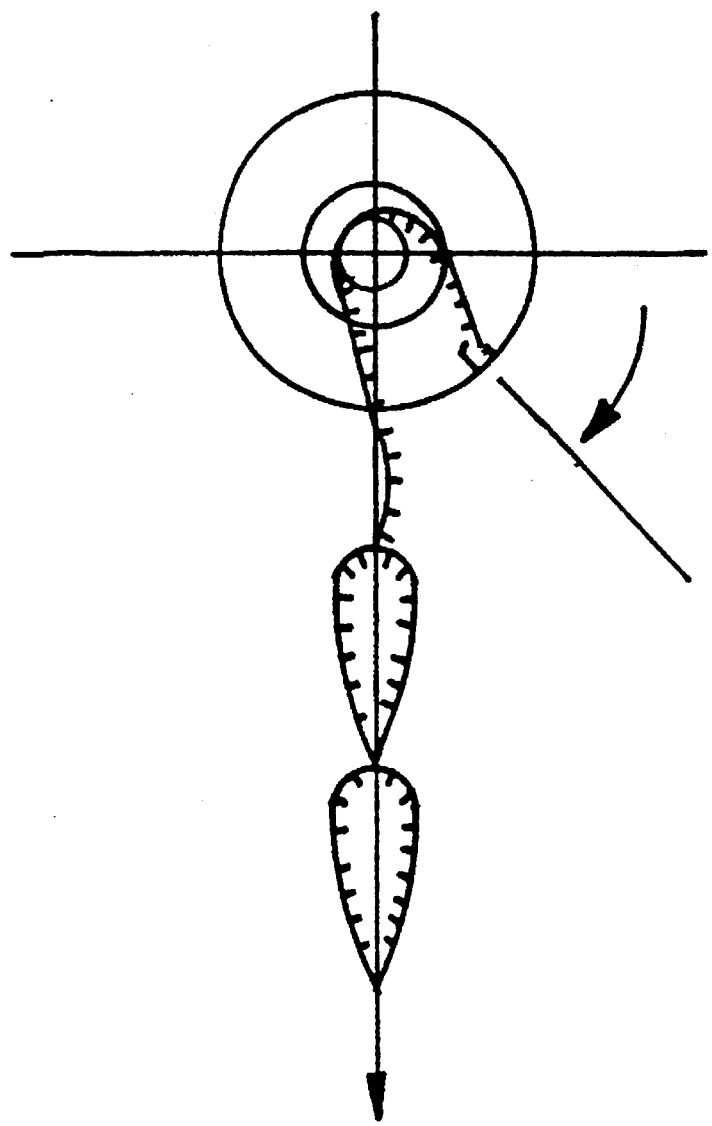
Figure 3:
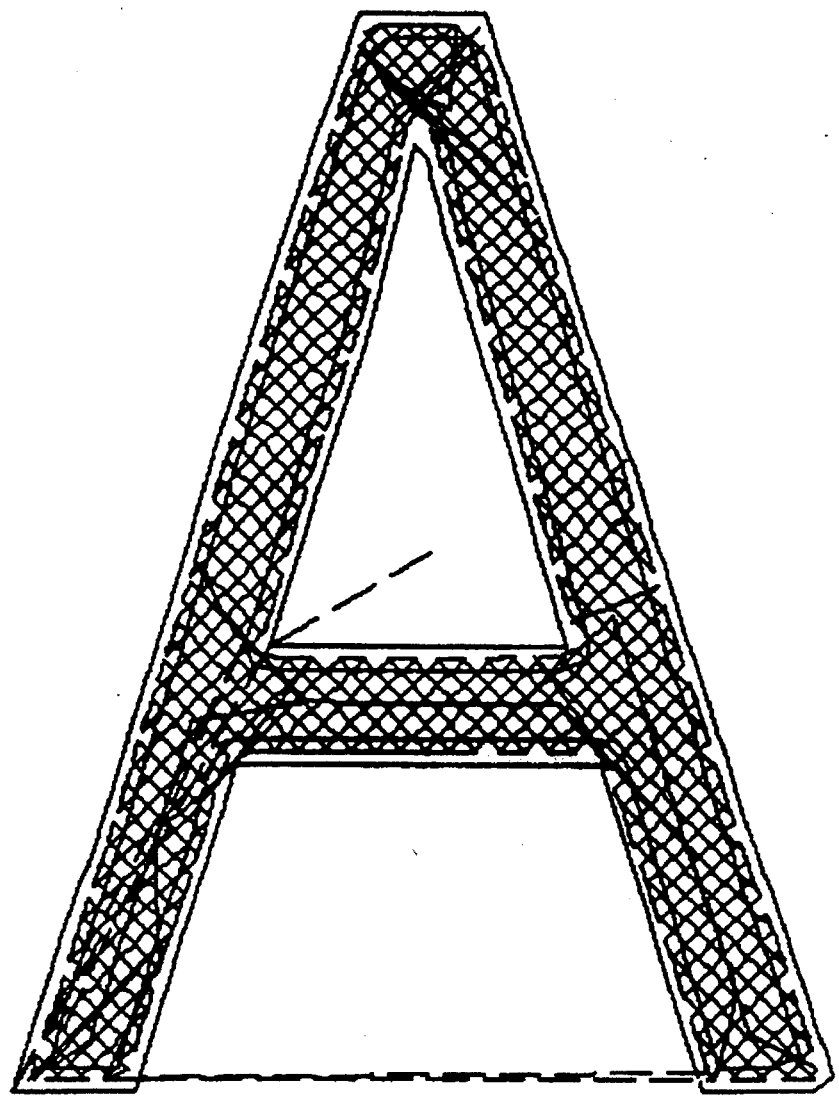
FIG. 3 is a diagrammatic illustration of a typical cross hatch or lattice chenille.
Figure 4A:
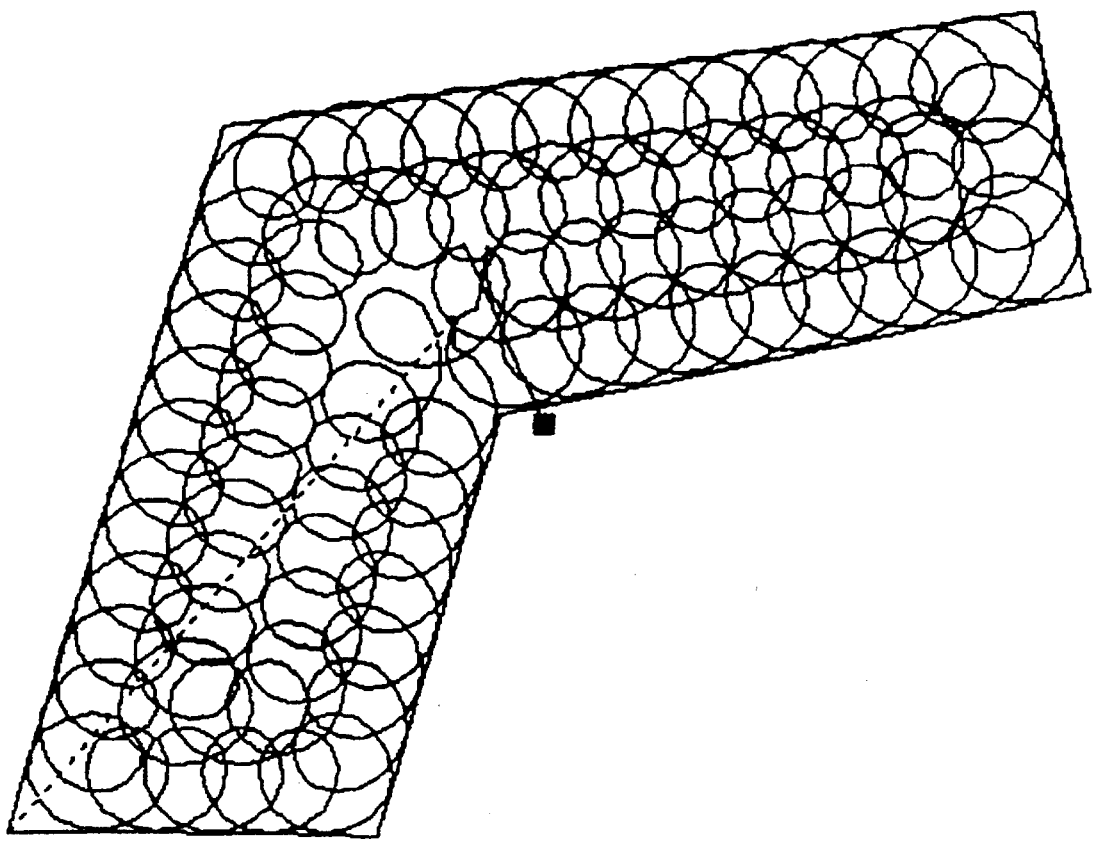
FIGS. 4a and 4b are diagrammatic illustrations of a computer generated spiral type chenille in accordance with the preferred method of the present invention.
Figure 4B:
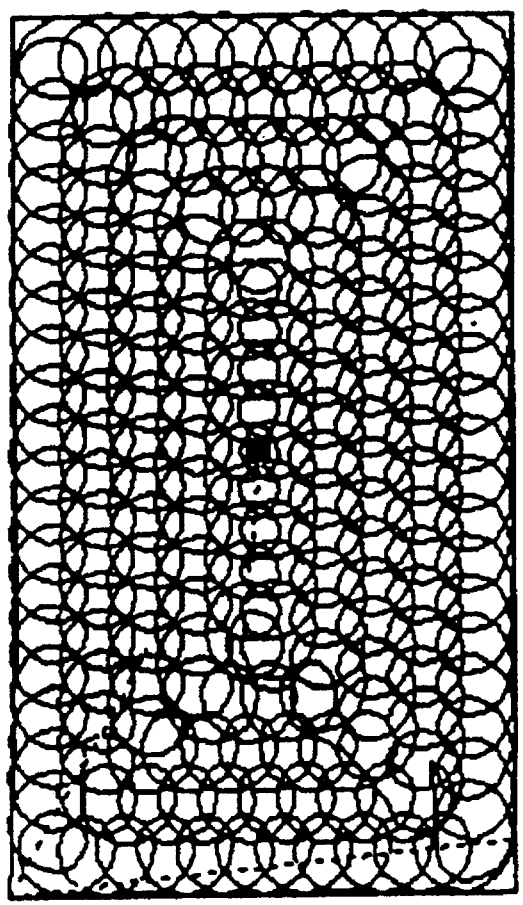

After this, preferably along these constructed polygons, spirals, like a spirograph, are placed, of varying size, in order to maintain a consistent filling of the area. Preferably the size of the spiral and the distance between the focal points from one to the next are the other determinant to the density of the fill. In placing the spirals, preferably prolate cycloids are generated. The stitches are then preferably placed along the spirals, at specified lengths, such as illustrated in FIG. 4.

For certain polygonal shapes, the concentric polygons leave certain "bald" spots on the shape that are not properly covered by the chenille stitching. In addition, for certain polygonal shapes, the stitching may be too dense or too coarse toward the center of the shape. In order to reduce this problem, the computer preferably determines a subset of the medial axis, that will be referred to hereinafter as the "spine" of the medial axis. The spine consists of those medial axis edges that define global axes of symmetry (see the aforementioned article entitled "Voronoi diagrams of Polygons: A Framework for Shape Representation"). The computer then preferably implements a pruning scheme in order to compute the spine. One such conventional pruning scheme which may preferably be employed is described in "Voronoi Skeletons: Theory and Applications," R. Ogniewicz and M. Ilg, IEEE Proc. Conf. on Vision and Pattern Recognition, Champaign Ill., 1992, pp. 63–69, the content of which is incorporated herein by reference.

The spine of the medial axis is represented as a graph which is traversed in depth first order. For each edge of the Voronoi Diagram, the computer preferably determines prolate cycloids and places equal length stitches along the contour of the prolate cycloids. Edges of the concentric polygons that are within a predetermined distance from the spine are pruned, i.e., deleted to provide modified concentric polygons. This prevents having too dense an area of stitching near the center of the shape. The edges of the modified concentric polygon that remain are stitched as described above, i.e., the computer creates prolate cycloids for each segment and places equal length stitches along the cycloids, thereby minimizing the occurrence of any bald spots in the filling of the modified concentric polygon with the chenille type stitches.

Figure 5:
FIG. 5 is a diagrammatic illustration of a design made entirely by placing chain stitches to cover the area in accordance with the preferred method of the present invention.

Chain stitching is a necessary stitch around all chenille and, as shown and preferred in FIG. 8, the presently preferred method of the present invention also enables chain stitches to be automatically generated. In this instance, preferably the same procedure as for generating chenille stitches is employed up through the sorting of the concentric polygons. Thereafter, however, rather than placing spirals along the polygons, chain stitches are placed on the perimeter of the offset or concentric polygons at a specified length. In this regard, if desired, an entire shape can be covered by chain stitches such as illustrated in FIG. 5. Thus, the chain stitching method of the present invention is not restricted to chenille and can be used in embroidery or any other concentric coverage of shapes.

In order to compute the loop-height of each spiro in the prolate cycloids being computed, the computer preferably prompts the user to input two parameters, namely, the stitch length, and the density (specified in stitches per square cm). The computer then preferably calculates the following parameters:

axisLineSpacing: the distance between two adjacent concentric polygons.

loopheight: the height of the spiro.

rollradius: the inner radius of the prolate cycloid.

penradius: the outer radius of the prolate cycloid.

The system then preferably computes these values using the following equations:

SPIRO_FACTOR= (7.0/3.0)*(4.0/5.0)*(3.0/4.0);

loopHeight=100.0*2.0*P1*SPIRO_FACTOR/((stitchLength/100.0)*density);

rollRadius=loopHeight/12.0;

lineSpacing= loopHeight*2.0/3.0;

penRadius= rollRadius*6.0;2

It should be noted that the above described method of the present invention may be preferably carried out by conventionally programming the computer of the computer aided design system to carry out the above steps with reference to the aforementioned articles concerning the theory behind Voronoi Diagrams and skeletons which the present invention employs.

What is claimed is:

1. In a method for automatically generating filled embroidery stitch patterns in a computer aided design system comprising a computer means capable of generating embroidery stitch patterns for controlling an embroidery machine in accordance with a selected embroidery stitch pattern, wherein said filled embroidery stitch patterns comprise filled embroidery stitch patterns having a polygon type shape and an associated fill density; the improvement comprising the steps of:

selecting an embroidery stitch pattern for said computer means to generate for controlling said embroidery machine, said selected embroidery stitch pattern having an associated polygon type shape having an outer edge;

determining a spine of a medial axis of a Voronoi Diagram for said selected polygon shape in said computer means, said Voronoi Diagram comprising Voronoi edges;

constructing a plurality of modified spaced apart polygon type shapes in said computer means which are concentric to said selected polygon type shape and extending from said outer edge to within a clip width of said spine, said computer constructed modified polygon type shapes being spaced apart from an adjacent concentric modified polygon type shape by a predetermined distance comprising a determinant of the fill density associated with said selected polygon type shape;

sorting said constructed modified concentric polygon type shapes in said computer means in order for providing for proper sequencing and minimal jumping of said selected stitch pattern in said embroidery machine from one part of said associated shape to another part of said associated shape;

generating a plurality of spirals of varying size in said computer means and placing said computer generated plurality of spirals of varying size in said embroidery machine along said computer constructed modified concentric polygon type shapes for maintaining a consistent filling of the area contained within said associated shape of said selected pattern while minimizing the presence of bald spots in said area being filled, the spirals having an associated size and distance in said embroidery machine between the focal points from one spiral to the next comprising another determinant of said fill density associated with said selected polygon type shape; and stitching along said plurality of placed spirals in said embroidery machine for creating thread loops for providing a chenille type stitching for filling said selected polygon type shape; whereby a chenille filled embroidery pattern is automatically generated for said embroidery machine under control of said computer means in said computer aided design system.

2. An improved method for automatically generating filled embroidery stitch patterns in accordance with claim 1 wherein said selecting step comprises the step of creating a desired polygon type outer shape in said computer means to be converted into said chenille filled embroidery stitch pattern.

3. An improved method for automatically generating filled embroidery stitch patterns in accordance with claim 2 wherein said creating step comprises the step of inputting said desired polygon type shape to said computer means in said computer aided design system.

4. An improved method for automatically generating filled embroidery stitch patterns in accordance with claim 1 further comprising the step of providing chain stitching in said embroidery machine around said selected polygon type shape for covering said chenille filled embroidery pattern with chain stitches.

5. An improved method for automatically generating filled embroidery stitch patterns in accordance with claim 4 wherein said chain stitch providing step comprises the step of placing said chain stitches in said embroidery machine on the perimeter of said computer constructed modified concentric polygon type shapes at a predetermined length.

6. An improved method for automatically generating filled embroidery stitch patterns in accordance with claim 1 wherein said spiral placing step comprises the step of generating prolate cycloids in said computer means.

7. An improved method for automatically generating filled embroidery stitched stitch patterns in accordance with claim 1 wherein said step of determining said spine of said medial axis of said Voronoi Diagram comprises the steps of creating rays in said computer means emanating in towards said selected polygon type shape from every corner of said selected shape that is less than 90 degrees, and constructing two rays in said computer means pointing in a direction normal to one of the edges of each corner having an interior angle greater than 90 degrees.

8. An improved method for automatically generating filled embroidery stitch patterns in accordance with claim 7 wherein said ray creating step in said computer means comprises the step of constructing in said computer means a vector that bisects the angle of the corner for said corners of said selected shape that are less than 90 degrees.

9. An improved method for automatically generating filled embroidery stitch patterns in accordance with claim 8 further comprising the step of tracing each ray to determine an ending point for the ray.

10. An improved method for automatically generating filled embroidery stitch patterns in accordance with claim 9 wherein each ray is equidistant from two parent sites and has a starting point, and wherein the step of tracing the ray comprises determining the ending point of the ray by computing the nearest point to the starting point at which the ray is equidistant from 3 sites.

11. An improved method for automatically generating filled embroidery stitch patterns in accordance with claim 1 wherein said step of constructing said plurality of modified spaced apart concentric polygon type shapes in said computer means comprises the step of, for each line segment in said shape, determining the endpoints of parallel line segments that are contained inside the Voronoi Diagram that are at a predetermined offset distance from each other.

12. An improved method for automatically generating filled embroidery stitch patterns in accordance with claim 11 wherein said step of constructing said plurality of modified spaced apart concentric polygon type shapes in said computer means further comprises the step of, for each point site at a non-convex edge of the selected polygon type shape, the computer determining a set of parallel parabolic arcs that lie inside the Voronoi Diagram that are at predetermined offset distance from each other.

13. An improved method for automatically generating filled embroidery stitch patterns in accordance with claim 1 wherein said step of constructing said plurality of modified spaced apart concentric polygon type shapes in said computer means comprises the step of, for all segments in said shape, constructing a new polygon in said computer means made up of those edges of said Voronoi Diagram that are closest to the edge being considered for each edge in said selected polygon type shape.

14. An improved method for automatically generating filled embroidery stitch patterns in accordance with claim 13 wherein said step of constructing said plurality of modified spaced apart concentric polygon type shapes in said computer means further comprises the step of sweeping a line through said polygon type shape and computing in said computer means all the segments of all positions of said line that fall in the interior of said polygon type shape.

15. An improved method for automatically generating filled embroidery stitch patterns in accordance with claim 14 wherein said step of constructing said plurality of modified spaced apart concentric polygon type shapes in said computer means further comprises the step of determining in said computer means for each of said edges which edges are adjacent to it for constructing said modified concentric polygon type shapes in said computer means.

16. An improved method for automatically generating filled embroidery stitch patterns in accordance with claim 1 wherein said step of constructing said plurality of modified spaced apart concentric polygon type shapes comprises the step of constructing a plurality of spaced apart polygon type shapes in said computer means which are concentric to said selected polygon type shape, and pruning the edges of said constructed concentric polygons that are within a predetermined clip width distance from the spine for providing said modified concentric polygon type shapes; whereby any tendency to provide too dense an area of stitching near the center of said selected polygon type shape is minimized.

* * * * *